Dec. 10, 1963   R. M. WILLIS   3,113,579
CONTACT LENS CLEANING AND STORING DEVICE
Filed Oct. 2, 1961   3 Sheets-Sheet 1
FIG. 1
FIG. 2
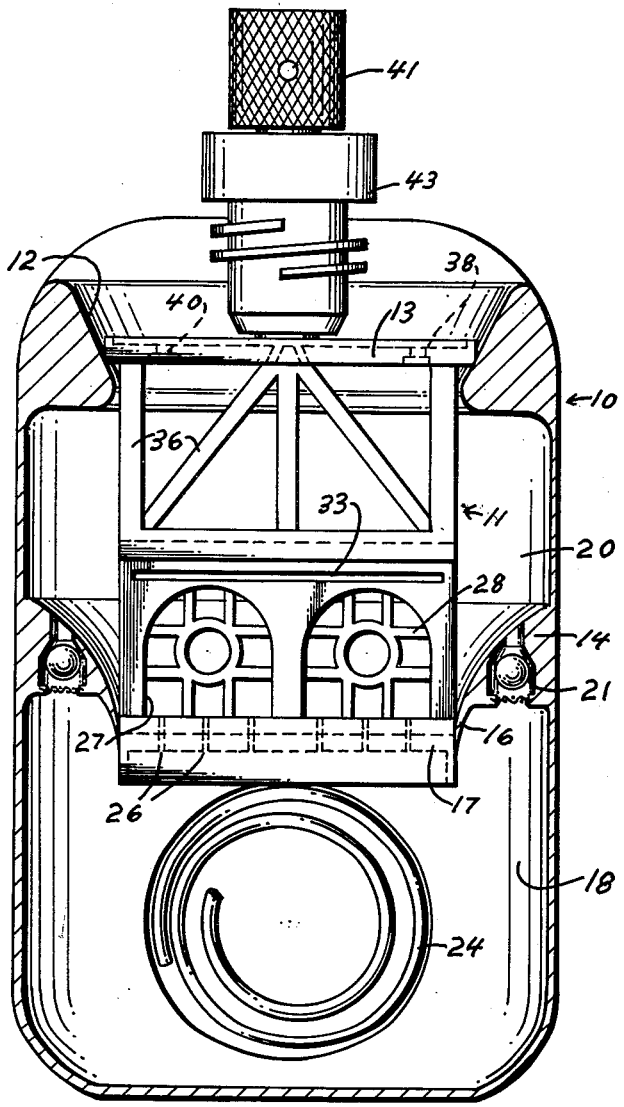
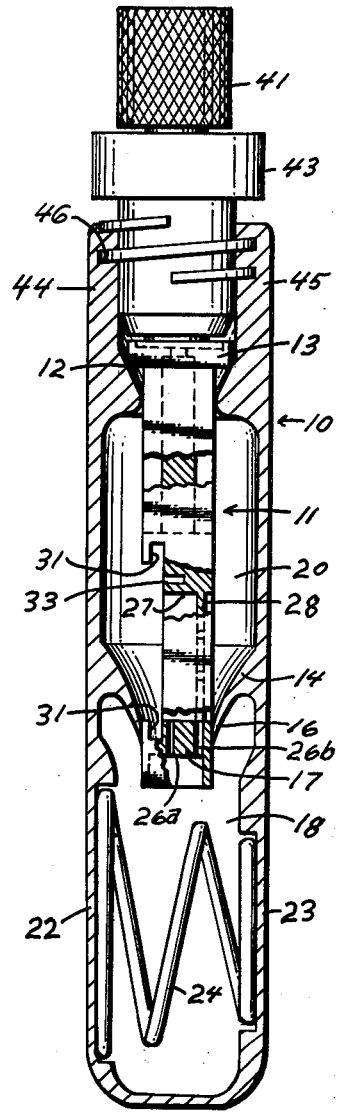
INVENTOR.
RODERICK M WILLIS
BY Barnes & Seed
ATTORNEYS Dec. 10, 1963 R. M. WILLIS 3,113,579
CONTACT LENS CLEANING AND STORING DEVICE
Filed Oct. 2, 1961 3 Sheets-Sheet 2
FIG. 5
FIG. 3
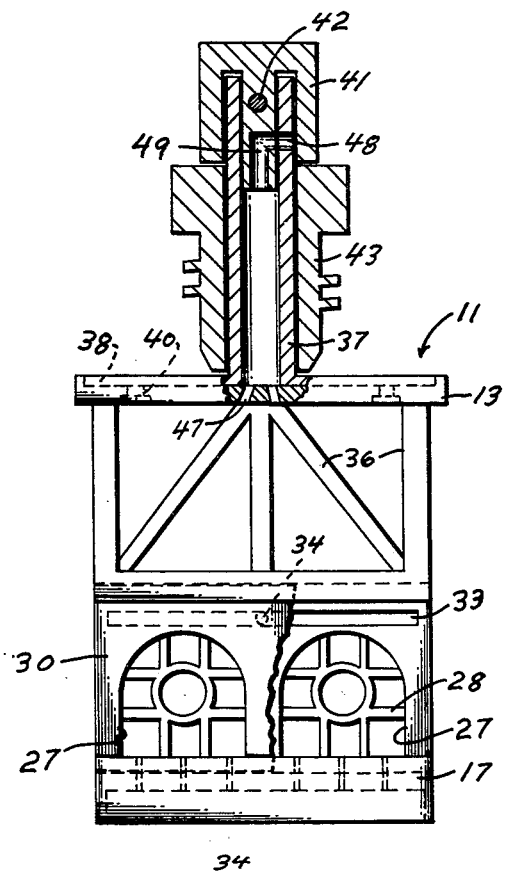
FIG. 4
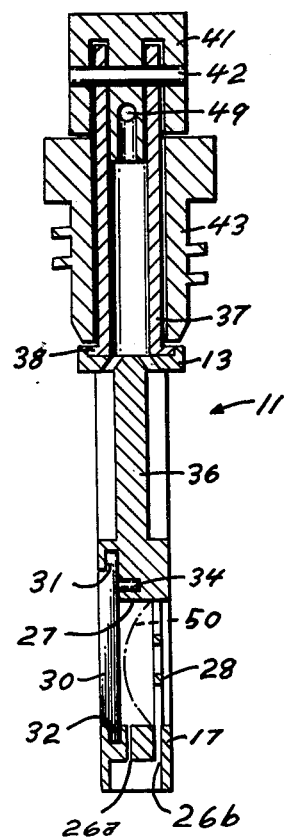
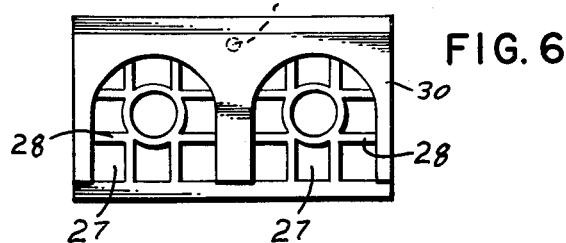
FIG. 6
INVENTOR.
RODERICK M. WILLIS
BY Barnes & Seed
ATTORNEYS Dec. 10, 1963  R. M. WILLIS  3,113,579
CONTACT LENS CLEANING AND STORING DEVICE
Filed Oct. 2, 1961  3 Sheets-Sheet 3
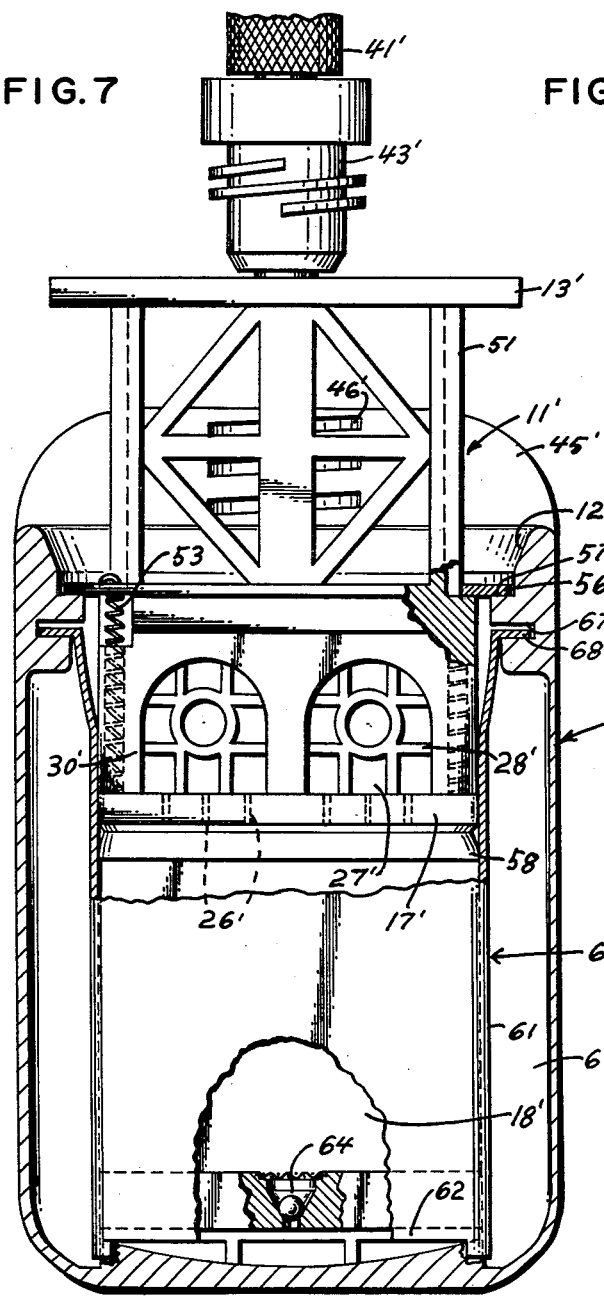
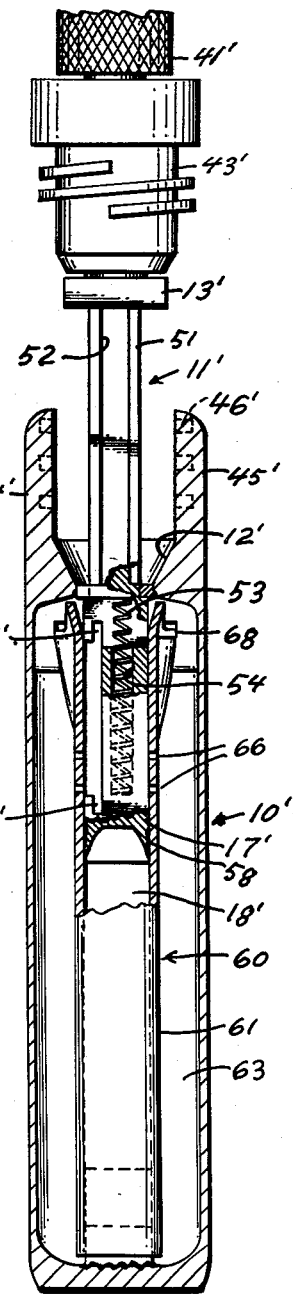
INVENTOR.
RODERICK M. WILLIS
BY Barnes + Seed
ATTORNEYS

United States Patent Office 3,113,579
Patented Dec. 10, 1963

3,113,579
CONTACT LENS CLEANING AND STORING
DEVICE
Roderick M. Willis, 2634 Thorndyke Ave.,
Seattle 99, Wash.
Filed Oct. 2, 1961, Ser. No. 142,201
8 Claims. (Cl. 134—145)

This invention relates to equipment for contact lenses, and more particularly to a cleaning and storing device for such lenses.

Though contact lenses offer many advantages over conventional eye glasses, there use does involve certain problems, most of which arise from the fact that the lenses are periodically removed from the eyes for extended lengths of time, such as during periods of sleep. One of the more troublesome problems is that of keeping the lenses clean. This is true not only with regard to small foreign particles which can cause, at the minimum, discomfort for the wearer, but also with regard to matter which may collect on the lens as a film to obscure vision and, if toxic, to damage the eye. Also the handling and storing of the lenses can cause some difficulty. If a lens is inadvertently misplaced or dropped, the small size and transparency of the lens makes it quite difficult to locate. Beyond this, the delicacy of the lens makes it very susceptible to damage. Even small abrasions on the lens surface can lessen its effectiveness and cause discomfort to the wearer. Moreover, the perimeter of the lens is feathered to form a thin and easily damaged edge portion.

Another consideration is that if a lens is allowed to become dry, a certain soaking period is required to return the lens surface to a properly moist condition where it will function in the eye with maximum comfort and effectiveness. While the lens is in the eye, the natural fluid emitted from the lachrymal glands keeps the lens properly moist. But during periods of removal, other provision must be made to insure the lens being maintained in this properly wetted condition.

Attempts have been made, in the prior art, to construct devices which will hold contact lenses in a safe manner and yet provide for the proper cleaning of the lens surfaces. However, to grip the lens for this purpose without damage is difficult, and the cleaning action itself presents problems. To rub a hard or stiff cleaning element over the lens could cause serious surface abrasion, while a softer or more yielding material will tend to flake off, with the detached particles sometimes adhering to the lens and then becoming lodged in the eye. An added difficulty is that some of the materials which lend themselves to use as a proper cleaning element will eventually pollute the cleaning solution in which they are immersed, so that residual cleaning fluid on the lens will damage the eye.

In view of these aforementioned problems, it is the general object of this invention to provide a device capable of storing contact lenses in a proper wetted condition, and also of safely, properly, and conveniently cleaning said lenses.

It is also an object of this invention to so arrange this device that the lenses may be easily and conveniently placed in the device and removed therefrom, with a minimum of opportunity for the lenses to become contaminated in any way.

More particularly, this invention purports to provide cleaning means which will not in any way damage or abrade the lens, but will so circulate fluid relative thereto as to accomplish the proper cleaning of the lens surface.

It is a further particular object to provide a device for the described purpose which will perform its intended functions with ease and expedition.

It is yet another particular object to so arrange the device that the cleaning fluid itself remains free of impurities.

Other more particular objects will, with the foregoing, appear and be understood from the following detailed description of the illustrated preferred embodiments. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

FIGURE 1 is a front elevational view, partly in section, showing a device embodying preferred teachings of my invention;

FIG. 2 is a side elevational view, partly in section, of the device of FIG. 1;

FIG. 3 is a front elevational view, partly in section, showing the lens carrying frame of this invention;

FIG. 4 is a longitudinal sectional view of the lens carrying frame;

FIG. 5 is a bottom plan view thereof;

FIG. 6 is a front elevational view, illustrating only the lens containing portion of the carrying frame;

FIG. 7 is a front elevational view partly in section of a second embodiment of my invention;

FIG. 8 is a longitudinal sectional view thereof.

Referring now to FIGS. 1–6, numeral 10 designates a squeeze case in which is removably inserted a lens-carrying frame 11. The case, at its upper end, has an outwardly flared mouth 12 which forms a seat for a cover plate 13 of the carrying frame. At about the mid-height of the squeeze case and integral therewith, is an inwardly extending collar 14 which has a yielding downturned inner edge portion 16 which grips in sealing fashion a jet plate 17 of the carrying frame. Thus the jet plate and the collar coact to partition the case interior into a lower compression chamber 18 and an upper head chamber 20. A plurality of check valves 21 are provided in the sealing collar 14 so as to allow flow therethrough only from the head chamber to the compression chamber.

The lower portion of the case is made sufficiently flexible so that the front and back walls thereof 22 and 23, respectively, can by moderate hand pressure be squeezed toward one another so as to compress the chamber 18. To expand the chamber 18 a compression spring 24 is located therein to urge the walls 22 and 23 apart, or alternatively the chamber walls themselves may be made sufficiently resilient to accomplish the same purpose.

To describe the carrying frame more particularly, its overall configuration is that of a flat rectangular structure. The upper and lower bases of the rectangle comprise, respectively, the cover plate 13 and the jet plate 17. Extending vertically through the jet plate are front and back rows of orifices 26a and 26b, respectively, which lead to two laterally spaced, lens-carrying pockets 27, said pockets being located immediately above the jet plate and formed as through-holes in the carrying frame. The rear of each pocket is covered with a grid 28, while the front is closed by a slidable gate 30. Serving as guides for this gate are two opposed horizontal channels 31 and 32 which are located on the frame one above and one below the pockets 27. An elongated horizontal slot 33, located in the frame above said pockets, receives slidably therein a pin 34 which projects rearwardly from the gate 30. The purpose of this pin and slot arrangement is to act as an end limit for the lateral movement of the gate, allowing the gate to be moved either to the right or left a sufficient distance to uncover one or the other of the pockets 27.

From this lower pocket-forming frame portion, the frame continues upwardly in the form of several struts 36 which connect at their upper ends to the aforementioned cover plate 13. Extending upwardly from the cover plate is a tubular stem 37, which has at its lower end an integral flange 38 by which the stem is attached to the cover plate 17 by screws 40. The upper end of the stem is covered by a suitable cap 41 that is secured to said stem by means of a pin 42. Journal mounted on the stem 37 and retained thereon by means of a cap 41 is an externally threaded follower nut 43. To provide a socket for said nut, the front and back mouth portions of the case 10 are extended upwardly to form lips 44 and 45, the upper lips having complementing mutilated threads 46 to engage the follower nut. Vent holes 47 are provided in the cover plate 13 to lead from the head chamber 20 to the interior of the stem 37. The stem and the cap are in turn vented at 48 and 49, so that the head chamber, through this venting arrangement 47—49, communicates with the ambient atmosphere.

In operation, the case 10 is kept nearly full with a mild cleaning fluid. To store the lenses, the carrying frame 11 is removed from the case, and the two lenses (one of which is indicated schematically at 50) are placed one in each of the pockets 27, the gate 30 being slid first to one side and then to the other so as to open first one and then the other of the pockets. The carrying frame is then inserted into the case 10 and the follower nut 43 is threaded to the case at 46 to seat the cover plate 13 onto the mouth 12 of the case so as to close the same. In this situation the lenses are properly immersed in the fluid so that they can be stored in this manner indefinitely. The reverse of this process is followed to remove the lenses from the case.

To clean the lenses (the lenses being placed in the carrying frame, which has then been inserted in the case) the thumb is pressed against one, and the fingers against the other, of the walls 22 and 23 of the case, so as to compress the chamber 18 and force fluid from this chamber through the orifices 26. Jets of cleaning fluid are emitted from said orifices to spray against both the concave and convex surfaces of the lenses and to pass into the head chamber 20. It should be noted that squeezing the walls of the compression chamber creates an increased pressure therein which acts to close the check valves 21 and to press the collar lip 16 more firmly against the sides of the jet plate 17 so as to reinforce its sealing action therewith. Upon release of the chamber walls, the spring 24 expands the compression chamber 18 so as to reduce the pressure therein and draw fluid from the head chamber through the check valves and into the compression chamber, from where the fluid may again be impelled through the orifices 26.

FIGS. 7 and 8 show a second embodiment of my invention. As in the previous embodiment, there is a case 10' in which is removably inserted a lens-carrying frame 11'. The frame has an upper cover plate 13' and a lower jet plate 17', the jet plate having orifices 26' which lead to lens-carrying pockets 27'. The pockets have rear grids 28' and a front gate 30' which is slidably mounted in guide channels 31' and 32'. A cap 41' and follower nut 43' are secured at the upper end of the carrying frame, and the nut is arranged to engage mutilated threads 46' in the upper lips 44' and 45' of the case.

This carrying frame 11' is modified, however, in several respects. First, two vertical struts 51, one on each side of the frame, are each formed with a vertical channel 52 to accommodate a related one of two tension springs 53, and for the same purpose two elongate holes 54 are formed in the lower frame portion as downward prolongations of said channels. The upper end of each spring is secured to a plunger ring 56 which seats on a shoulder 57 formed in the mouth 12' of the case 10', while the lower end is secured to the jet plate 17'. The jet plate 17', at its lower periphery, is provided with a downwardly flaring cup 58, which functions as a sliding seal on a downward stroke of the carrying frame.

In this latter regard, referring now to the case 10', there is provided therein a verticaly disposed sleeve-like receptacle 60 whose inner surface is uniform in horizontal section and which fits about the cup 58 so as to form the aforementioned sliding seal therewith. Thus, in a manner similar to the previous embodiment, the jet plate 17' forms with the receptacle 60 a compression chamber 18'. The walls 61 and base 62 of this receptacle are arranged to be spaced from case 10' so as to form therebetween a jacket-like reservoir 63. In the base of the receptacle is provided a check valve 64 which permits flow therethrough only from the surrounding reservoir 63 into the receptacle, and return ports 66 are provided in the upper portion of the receptacle wall to enable fluid to flow from the receptacle into the reservoir. Two side slots 67 are located in the mouth 12' below the shoulder 57, each slot to receive a related one of two flanges 68 which extend in opposite directions laterally from the top edge of the receptacle.

With respect to the operation of this second embodiment, the lenses are placed in the carrying frame 11' in the same manner as in the first embodiment. Both receptacle 60 and the surrounding reservoir 63 are nearly full with cleaning fluid. The frame is inserted into the receptacle 60 so that the cover plate 13' seats in the mount 12' and the follower nut 43' is threaded at 46' into the lips 44' and 45', thus immersing the lenses in the fluid. In this location, the lenses may be stored indefinitely.

To clean the lenses, the follower nut is backed off and released. The action of the tension springs 53 lifts the frame 11' partially out of the case 10', the fluid above the jet plate 17' passing by gravity flow through the return ports 66 into the reservoir 63, and fluid being drawn into the compression chamber 18' through the check valve 64. The frame 11' is then depressed to force the jet plate 17' into the receptacle so as to close the check valve and force fluid through the orifices 26', so that the fluid is emitted in jets to wash against the front and back lens surfaces. Release of the frame 11' will cause another charge of fluid to be drawn into the lower receptacle portion, with the subsequent depression of the frame again causing fluid jets to wash against the lens surfaces.

It is believed that the invention will have been clearly understood from the foregoing detailed description of my now preferred illustrated embodiments. Changes in the details of construction will suggest themselves and it is accordingly my intention that no limitations be implied and that the hereto annexed claims be given the broadest interpretation to which the employed language fairly admits.

What I claim is:

1. A lens storing and cleaning device comprising an outer case having an access opening and being adapted to contain a cleaning fluid, a lens-carrying frame removably inserted within said case, said frame having a front jet plate which forms a seal with said case so as to define a compression chamber therewith, said frame having a rear cover plate to close said access opening and seal the fluid in said case, said frame adapted to carry a set of lenses immersed in said fluid, means to compress said chamber so as to expel fluid from said chamber through said plate in a jet fashion so that said expelled fluid washes against said lens surfaces, and means to return said expelled fluid to said compression chamber.

2. A lens storing and cleaning device comprising an outer case having an access opening and being adapted to contain a cleaning fluid, a lens-carrying frame slidably inserted within said case, said frame having a front jet plate which forms a sliding seal with said case so as to define a compression chamber therewith, said frame having an outer cover plate to close said access opening and seal the fluid in said case, said frame and case being so arranged that movement of said frame into the case acts to compress said chamber so as to expel fluid from said chamber and through said plate in a jet fashion so that said expelled fluid washes against said lens surfaces, and means to return said expelled fluid to said compression chamber.

3. A lens storing and cleaning device comprising an outer case having an access opening and being adapted to contain a cleaning fluid, a lens-carrying frame removably inserted within said case, said frame having a front jet plate which forms a seal with said case so as to define a compression chamber therewith, said frame having a rear cover plate to close said access opening and seal the fluid in said case, said frame adapted to carry a set of lenses immersed in said fluid, the case portion which defines said chamber being sufficiently flexible so that squeezing said last named case portion causes said chamber to compress so as to expel fluid from said chamber and through said plate in a jet fashion so that said expelled fluid washes against said lens surfaces,, and means to return said expelled fluid to said compression chamber.

4. The device as recited in claim 3, wherein said case has an inwardly extending yielding collar to form a seal with said jet plate.

5. The device as recited in claim 4, wherein there are check valve means in said collar to allow said expelled fluid to return to said compression chamber.

6. A lens storing and cleaning device comprising an outer case having an access opening and being adapted to contain a cleaning fluid, said case having an outer wall and an inner receptacle forming with said wall a reservoir, a lens-carrying frame removably inserted within said receptacle, said frame having a front jet plate which forms a sliding seal with said receptacle so as to define a compression chamber therewith, said frame having a rear cover plate to close said access opening and seal the fluid in said case, said frame being adapted to carry a set of lenses immersed in said fluid, said frame and receptacle being so arranged that movement of said frame into said receptacle acts to compress said chamber so as to expel fluid from said chamber and through said plate in a jet fashion so that said expelled fluid washes against said lens surfaces, a return passage leading from the upper receptacle portion to said reservoir, and check valve means in said receptacle portion that defines said compression chamber, so that expansion of said chamber acts to draw fluid from said reservoir through said valve means and into said compression chamber.

7. A lens storing and cleaning device comprising an outer case having an access opening and being adapted to contain a cleaning fluid, a cover to close said access opening and seal said fluid in the case, and a lens carrying frame inserted within said case, said frame having a jet plate which reaches across the interior of said case so as to define a chamber therewith, said frame having means to contain said lenses at a location proximate said plate, and fitting slidably in said case so that sliding said frame in said case acts to reduce the volume of said chamber so as to expel fluid through said jet plate.

8. A contact lens cleaning device comprising, a case adapted to carry a cleaning fluid and having an outside opening for insertion and removal of a contact lens to be cleaned, a jet plate traversing said case and forming therewith a compression chamber displaced from said outside opening and a lens receiving chamber between said jet plate and said outside opening, said jet plate having jet openings therethrough connecting said chambers, a contact lens holding frame in said lens receiving chamber adapted to receive a contact lens and hold the same adjacent to said jet plate, means to compress said compression chamber so as to expel fluid therefrom through said plate into said lens receiving chamber in a jet fashion so that said expelled fluid washes against the surfaces of a contact lens held in said frame from displacement relative to said jet plate by said expelled fluid, and means to return said expelled fluid to said compression chamber.

References Cited in the file of this patent

UNITED STATES PATENTS

| | | |
|---|---|---|
| 574,606 | Heideman | Jan. 5, 1897 |
| 616,372 | Tuttle | Dec. 20, 1898 |
| 2,103,699 | Sheehan | Dec. 28, 1937 |
| 2,634,738 | Fuller | Apr. 14, 1953 |
| 2,741,253 | Bernier | Apr. 10, 1956 |
| 2,944,661 | Goldstein | July 12, 1960 |